United States Patent [19]

Vroenen

[11] Patent Number: 4,631,995
[45] Date of Patent: Dec. 30, 1986

[54] TOOLING APPARATUS

[76] Inventor: John J. Vroenen, 17744 Hinton Ave., Hesperia, Calif. 82345

[21] Appl. No.: 799,243

[22] Filed: Nov. 18, 1985

[51] Int. Cl.$^4$ .......................................... B23B 25/00
[52] U.S. Cl. ............................................. 82/39; 82/30
[58] Field of Search .......................... 82/39, 38 R, 30; 51/238 R, 238 S

[56] References Cited

U.S. PATENT DOCUMENTS

| | | | |
|---|---|---|---|
| 1,419,786 | 6/1922 | Waterer | 82/39 |
| 2,511,930 | 6/1950 | Martens | 82/39 |
| 3,062,104 | 11/1962 | Deflandre | 82/30 |
| 3,521,526 | 7/1970 | Olig et al. | 82/30 |
| 4,177,701 | 12/1979 | Schulz | 82/39 |

Primary Examiner—Lowell A. Larson
Assistant Examiner—Jerry Kearns
Attorney, Agent, or Firm—Gausewitz, Carr & Rothenberg

[57] ABSTRACT

A tooling apparatus having a main somewhat hollow yoke-like housing adjustably positionable in micrometer increments relative to a supporting base member which may be readily and fixedly attached to the lathe bed. The yoke housing is provided with an enlarged opening for receiving a rotating assembly including a plurality of radially adjustable jaw members adapted for engaging the outer surface of an elongate work piece for retention of the work piece within the jaws thereof. The jaw members may be adjusted in micrometer increments for precise positioning of the work piece relative to the opening thereof, and relative to the lathe chuck, either centrally relative thereto, or offset therefrom. The housing and rotating jaw assembly are sealed and provided with bearings therein to permit rotation while enabling passage of fluid through hollow openings therein for enabling lubrication and cooling to permit high speeds of rotation 20 during machining of a work piece supported by the lathe chuck and the apparatus.

15 Claims, 8 Drawing Figures

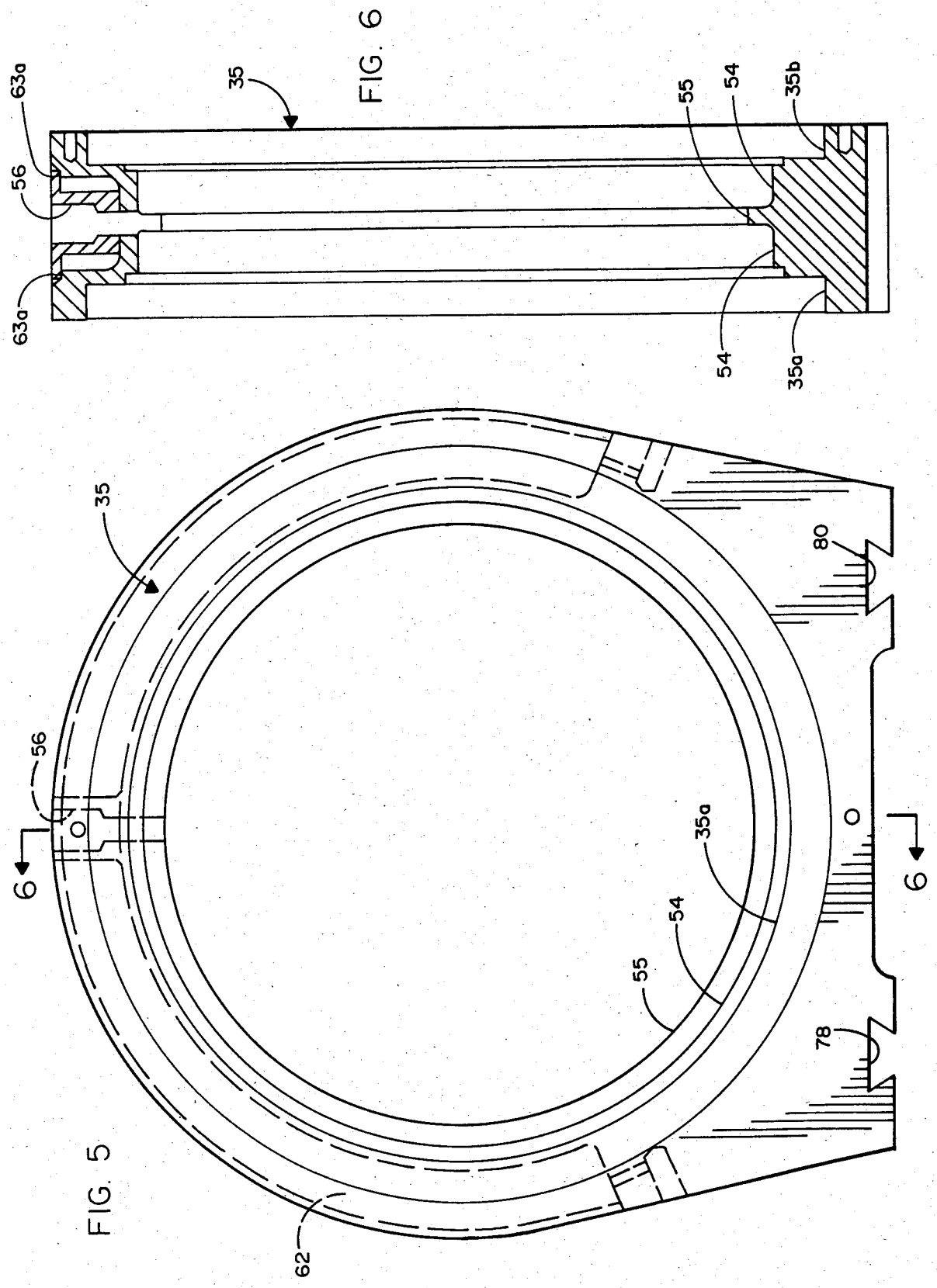

TOOLING APPARATUS

BACKGROUND OF THE INVENTION

The background of the invention will be discussed in two parts:

1. Field of the Invention

This invention relates to tooling apparatus, and more particularly to an indicating center support apparatus for use with a machine lathe or the like.

2. Description of the Prior Art

In the machine cutting of long work pieces of cylindrical cross-section supported between a chuck and a tail stock, some means of support may be required at a mid-point of the work piece in order to avoid excess vibration during the machining or cutting operation. Alternatively, very slow speeds of rotation of the work piece may be required to prevent such vibration or chattering during cutting operations. In most instances, the precision and the accuracy of the cut may be affected.

Prior art devices for use with machine tools such as cutting lathes for supporting long work pieces have included a device referred to as a steady rest. The steady rest is a device which may be attached to the bed of the lathe, and is provided with a central opening through which extends the work piece. Within the central opening, there are a plurality of rollers on arms with the rollers engaging the outer surface of the work piece. Such steady rest devices are suited for cylindrical work pieces only, and afford little in the way of adjustment, but serve a primary purpose of simply supporting a cylindrical work piece having one end thereof secured within the chuck of the lathe. The steady rest support is generally positioned in proximate relation to the cutting tool. With such a steady rest, if the work piece is being machined, such as with a cutting tool, the other end of the work piece is preferably supported within a tail stock. Such steady rests have been virtually unusable for precision cutting of a long work piece supported at only one end by the chuck.

Furthermore, if the machining operation is to be performed with a non-cylindrical work piece, or if the work piece is to be offset or eccentric relative to the lathe chuck, a steady rest cannot be employed.

It is an object of the present invention to provide a new and improved tooling apparatus for support of a long work piece during cutting and machining operations.

It is another object of the present invention to provide a new and improved tooling apparatus for securely and rotatably supporting a long work piece of cylindrical or other cross-section.

It is still another object of the present invention to provide a new and impoved tooling apparatus which enables support of an offset positioned long work piece within the chuck of a lathe with or without use of a tailstock, while enabling rotation of the work piece for precision eccentirc cuts.

SUMMARY OF THE INVENTION

The foregoing and other objects of the invention are accomplished by providing a tooling apparatus having a main somewhat hollow yoke-like housing adjustably positionable in micrometer increments relative to a supporting base member which may be readily and fixedly attached to the lathe bed. The yoke housing is provided with an enlarged opening for receiving a rotating assembly including a plurality of radially adjustable jaw members adapted for engaging the outer surface of an elongate work piece for retention of the work piece within the jaws thereof. The jaw members may be adjusted in micrometer increments for precise positioning of the work piece relative to the opening thereof, and relative to the lathe chuck, either centrally relative thereto, or offset therefrom. The housing and rotating jaw assembly are sealed and provided with bearings therein to permit rotation while enabling passage of fluid through hollow openings therein for enabling lubrication and cooling to permit high speeds of rotation during machining of a work piece supported by the lathe chuck and the apparatus.

Other objects, features and advantages of the invention will become apparent from a reading of the specification when taken in conjunction with the drawings, in which like reference numerals refer to like elements in the several views.

BRIEF DESCRIPTION OF THE DRAWINGS

FIG. 5 is a front elevational view, of the housing yoke of the tooling apparatus of FIG. 3;

FIG. 6 is a cross-sectional view of the housing yoke of FIG. 5 as viewed generally along line 6—6 thereof;

FIG. 8 is a front elevational view, partially broken away, of the base assembly used with the tooling apparatus of FIG. 3.

DESCRIPTION OF THE PREFERRED EMBODIMENT

Figure 1:
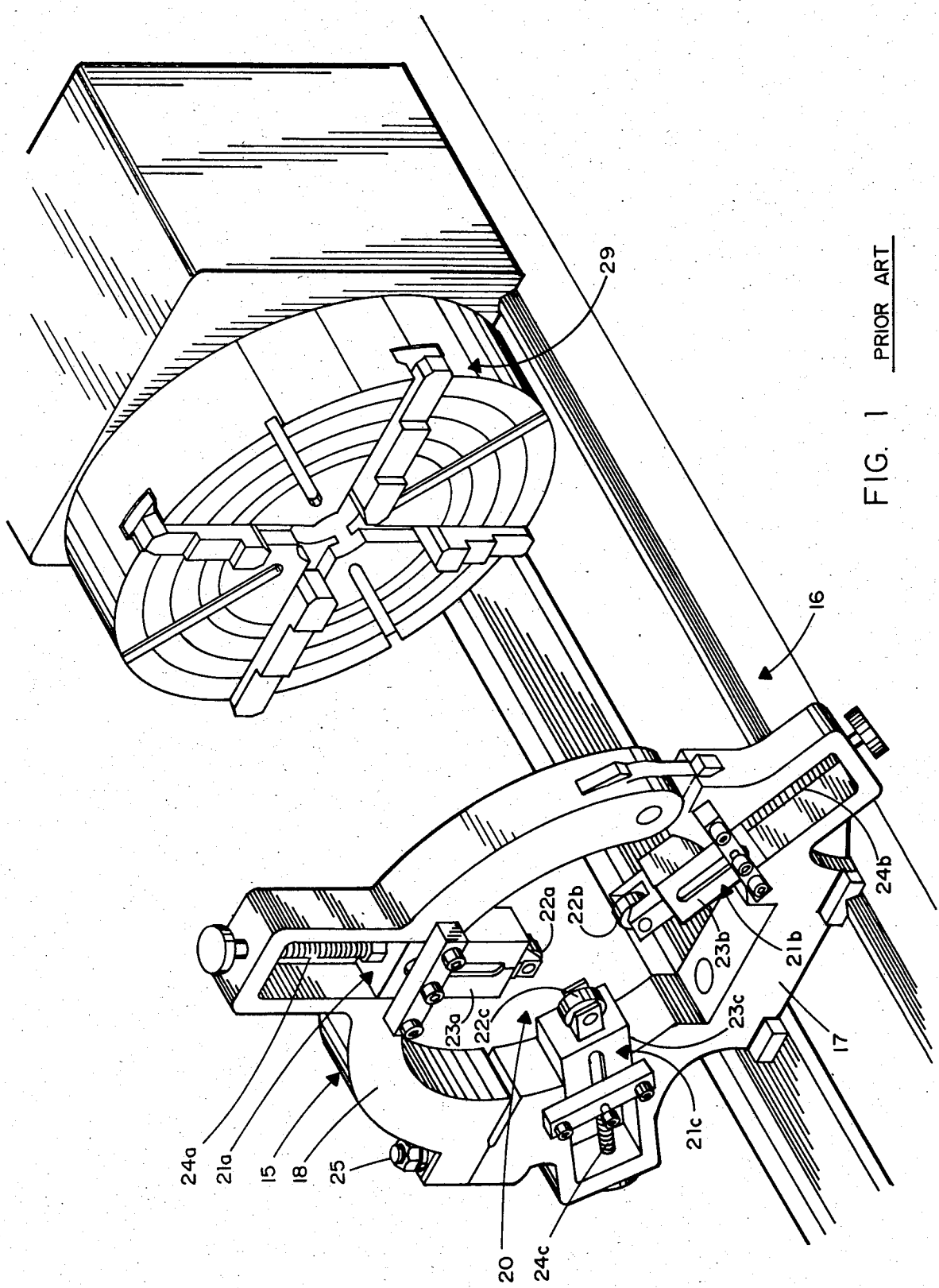
FIG. 1 is a perspective view of the prior art steady rest in use on a metal lathe for support of a long work piece.

Referring now to the drawings, and particularly to FIG. 1, there is shown a prior art steady rest 15 mounted on the bed of a lathe 16. The steady rest 15 includes a generally U-shaped supporting base member 17 securable to the bed of the lathe 16, with a pivotable generally U-shaped upper member 18 configured for defining an enlarged center opening 20 into which extends a plurality of arm members 21a, 21b and 21c, with each arm member having a roller bearing 22a, 22b and 22c, respectively rotatably attached to the end thereof, the arm members being displaced 120 degrees apart. Each of the arm members 21a, 21b and 21c includes a block portion 23a, 23b, and 23c, respectively, each being slidably mounted within a machined slot in one of the base member 17 and upper member 18, with radial positioning of the arm members 21a, 21b and 21c being accomplished by adjustment bolts 24a, 24b and 24c, respectively. The roller bearings 22a, 22b and 22c are positioned for rolling contact with the surface of a cylindrical work piece by adjusting the position of the arm members 21a, 21b and 21c relative to the base and upper members 17 and 18.

In operation, the upper member 18 is hinged out of the way and a work piece is positioned within the enlarged opening 20 where it rests on the bearings 22b and 22c of the two lower arm members 21b and 21c. The upper member 18 is then pivoted to a closed position as shown, and a locking bolt 25 is passed through aligned apertures in the flanges opposite the hinge for securing the upper and base members 18 and 17 together. The work piece has one end thereof secured within a chuck 29 which attaches to the driven block of the lathe 16, with the other end secured for rotation by means of a tailstock (not shown), with the steady rest 15 intermediate the ends of the work piece. The steady rest 15 simply provides a measure of support for the supported portion of a cylindrical work piece.

With such steady rests 15, only cylindrical work pieces may be employed, and the work piece must be positioned on the center of rotation of the lathe head 16a. That is, the steady rest 15 cannot be employed when a work piece is supported by a four jaw chuck or the like with the center thereof offset from the center of rotation. As the work piece rotates for cutting, the bearings 22a, 22b, and 22c, being of small diameter, are rotating at speeds which are many times greater than the speed of rotation of the work piece, which generates heat within the bearings, oftentimes resulting in binding or seizure of the bearings.

Although a steady rest 15 may be utilized with or without a tail stock, to enable use of the steady rest 15, a work piece must first be prepared, and this preparation entails center drilling of the end to be held by the tailstock, this center drilling being performed by hand. Then, a register is turned, this operation involving the smoothing or surface finishing of that part of the work piece to be received within the steady rest. If smoothing is not performed correctly, and the work piece is to be cut or machined, and surface defect at the point of contact of the roller bearings 22a, 22b and 22c, will affect the cut detrimentally.

While face cutting may be performed with the steady rest 15 by supporting one end of a cylindrical work piece within a chuck and the other end by a steady rest 15, the depth of cut is minimal, at about 0.050 to 0.070 inch. In addition, face cutting with a steady rest 15 is not advisable where accuracy is required. For surface or diameter cutting of a work piece, the depth of cut is likewise limited to depths of about 0.100 inch on the side or 0.200 on the diameter. During either face or diameter cutting with use of a steady rest 15, pressure is exerted on the work piece surface by the cutting tool. This pressure, in turn, causes twisting of the roller bearings 22a, 22b and 22c, and likewise moves the work piece away from the roller bearing located on the same side as the cutting tool.

For example, by reference to FIG. 1, if the work piece is set up for surface cutting with the cutting tool positioned on the side of the lathe 16 nearest arm 21c, the work piece will be urged away from bearing 22c. This movement of the work piece toward the other two bearings 22a and 22b causes torsional stresses in the bearings 22a and 22b, that is, a twisting about the longitudinal axes of the arms 21a and 21b. As the work piece is rotated, it attempts to return to its original position, and with the twisted bearings, the work piece tends to ride out of the chuck. In addition, chattering, or vibration, occurs at the point of contact of the roller bearings 22a and 22b with the surface of the work piece, with the vibration hammering at the slide blocks 23a and 23b, thereby loosening the adjustment bolts 24a and 24b. To complicate matters, the tolerances of such small diameter roller bearings may be one to two thousandths of an inch, and with the rapid rotation of the bearings relative to the rpm of the lathe, additional tolerance is rapidly induced by premature wear of the rollers within the bearings. By way of example, with a one inch diameter roller bearing 22a and an eight inch work piece, the rotation of the roller bearing 22a will be eight rotations for one rotation of the work piece. With the lathe 16 rotating at 110 rpm for this work piece, the roller bearing 22a will be rotating at 880 rpm, thus generating heat within the low tolerance bearings.

In many instances, during surface or face cutting, the removed chips tend to fly, oftentimes lodging between the roller bearings 22a, 22b and 22c, and the smooth surface of the work piece. The chips then damage this surface, and when the surface finish is critical, such marring or scratching of the surface is unacceptable. As a consequence of the many inherent limitations and problems with the steady rest 15, its use has been severely limited to rough, non critical or low accuracy jobs, or to the machining of work pieces in which surface finish is not critical.

Furthermore, even with a cylindrical work piece, the steady rest 15 cannot be used with a dial indicator for ensuring accurate center positioning of a cylindrical work piece, due to the loose tolerances employed in such devices. For screw thread cutting, such as API threads of 3 to 5 threads per inch with a taper of 2" to 3" per foot, a steady rest cannot be employed at all.

In accordance with the invention to be described, however, all of the disadvantages of the steady rest have been overcome. An indicator may be used to center the work piece within normal machining precision tolerances without use of a tail stock; chattering and vibration are eliminated; cuts of 0.250 on the face and 0.900 on the diameter of a work piece may be readily achieved with normal machining precision; API threads can be accurately cut; center drilling of the work piece is not required; turning of a register is not required; the surface finish is not marred or scratched during cutting or machining; noncylindrical work pieces can be readily machined; and the work piece can be offset for eccentric machining or cutting.

Figure 2:
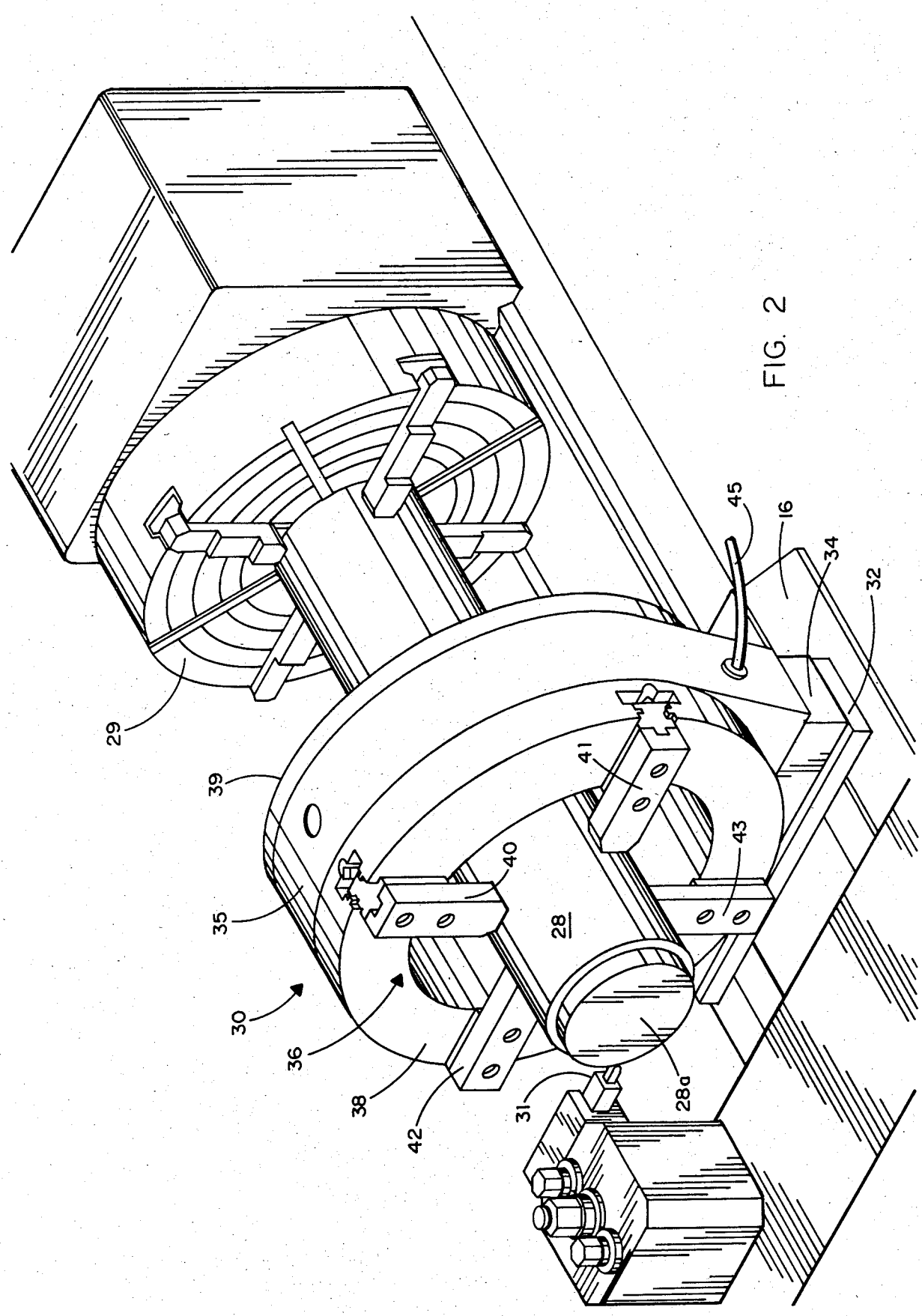
FIG. 2 is a perspective view of the tooling apparatus according to the invention, in use on a metal lathe for support of a long work piece for cutting at one end thereof.

Referring now to FIG. 2, there is shown the tooling apparatus, generally designated 30, in accordance with the present invention, in which the tooling apparatus 30 may be used in lieu of a tail stock to support one end of a work piece 28 with the other end within the chuck 29 of the lathe 16. Cutting and machining operations may be performed on either side of the apparatus 30, that is intermediate the chuck 29 and apparatus 30, or on the end or face of the work piece 28 in overhanging relation to the apparatus 30, such as illustrated by the cutting tool 31 machining the face 28a of the work piece 28.

Figure 3:
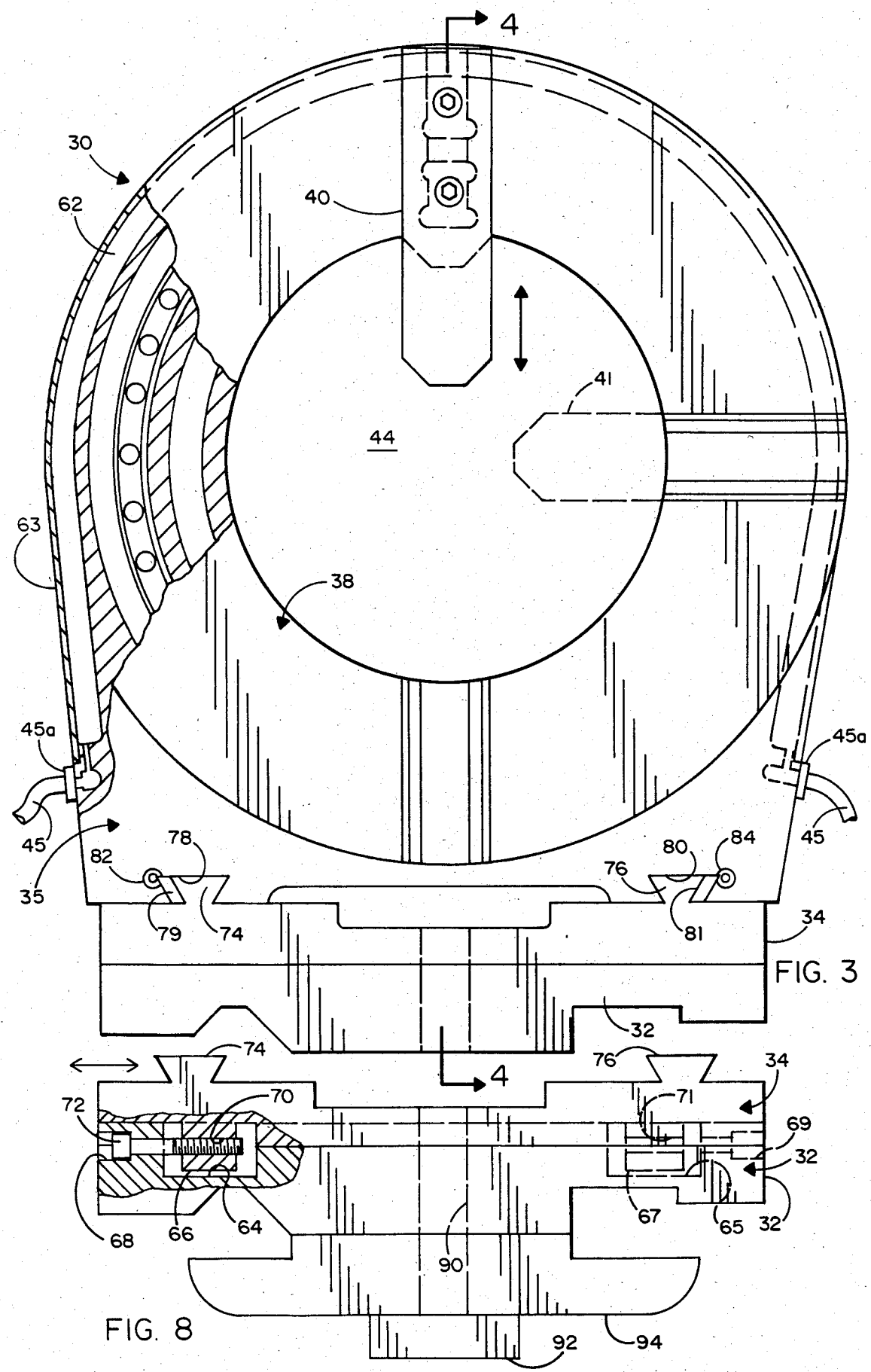
FIG. 3 is a front plan view of the tooling apparatus of FIG. 2, partially broken away to illustrate interior details thereof, with certain components eliminated.

Briefly, referring to FIGS. 2 and 3, the apparatus 30 includes a base assembly of a lower base 32 and an upper base 34, the bases being adapted for securing to each other and to the bed of the lathe 16; a housing yoke 35 attachable for adjustment relative to the upper base 34; a rotating jaw assembly, generally designated 36, which includes a front plate member 38, a rear plate member 39, and a plurality of jaw assemblies 40–43, radially slidable relative to the front plate member 38, and interior components which will be described hereinafter. Means, such as hoses 45 are coupled to the yoke housing 35 for passage of cooling fluids through passageways formed on the interior of the yoke housing 35 as will be described. With the exception of seals, all of the parts are formed of machined metal, such as steel or aluminum, or suitable alloys with good thermal conductivity.

In essence, the front and rear plate members 38 and 39 are coupled together to form a hub-like rotatable assembly with enlarged hub flanges surrounding the sides of the housing yoke 35, with the interior portions and surfaces suitably machined or milled to provide internal cooling and lubrication, with the jaw assemblies 40-43 being radially adjusted to grip the surface of the work piece 28, the plate members 38, 39 and jaw assemblies 40-43 then rotating concurrently with the work piece 28. As will be described, micrometer adjustments are provided for minute adjustment of the positions of the upper base relative to the lower base, as well as adjustments of the positions of the jaw assemblies 40-43 relative to the work piece.

Inasmuch as the work piece 28 is supported within the enlarged opening 44 of the rotating jaw assembly 36, a dial indicator may be used for accurate positioning of the work piece 28 relative to the axis of rotation thereof. Furthermore, with the rotating jaw assembly 36, the work piece 28 may be positioned on the lathe chuck 29 offset from the center thereof, and supported and rotated by the rotating jaw assembly 36 offset from the center thereof. Additionally, a non-cylindrical work piece 28 may be machined or cut using the tooling apparatus 30 with a four jaw chuck 29 on the lathe 16.

Figure 4:
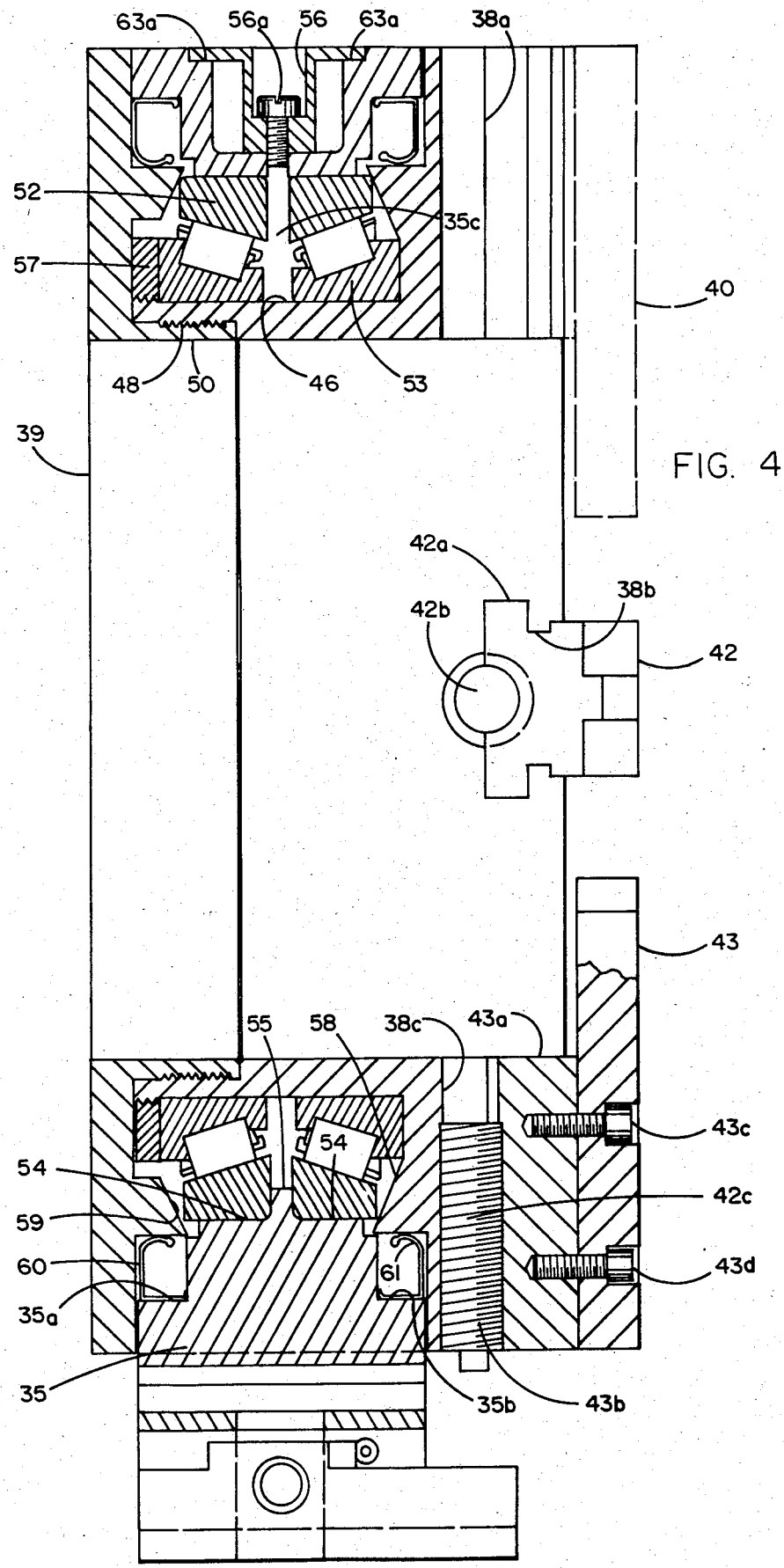
FIG. 4 is a cross-sectional view of the tooling apparatus of FIG. 3, as viewed generally along Line 4—4 thereof.

Referring now to FIGS. 3 and 4, there is shown in plan and cross-section, the tooling apparatus 30, with portions thereof removed and cut away to illustrate the interior components. The front plate 38 has an enlarged generally washer-shaped front surface with an enlarged central opening 44 through which the work piece 28 extends for having the surface thereof engaged by and retained by the jaw members 40-43. As best illustrated in FIG. 4, each of the jaw members 40-43 is identically configured and includes a jaw slide member and a micrometer adjusting screw received within a slotted radially extending opening in the front plate member 38. The slotted openings are designated 38a, 38b, and 38c, and are configured with side slots for enabling sliding of the slide jaw members, two of which are shown and designated 42a and 43a, the positions of which are radially adjustable by means of adjusting screws 42b and 43b, which coact between threaded semicircular slots in the bottom of the rounded portion of slots 38a, 38b and 38c, and mating semicircular rounded slots in the adjacent surface of the jaw slide members 42a, 43a, etc. The jaws 40-43 are suitably attached to the jaw slide members, such as slide member 43a by such means as cap screws 43c and 43d.

Figure 7:
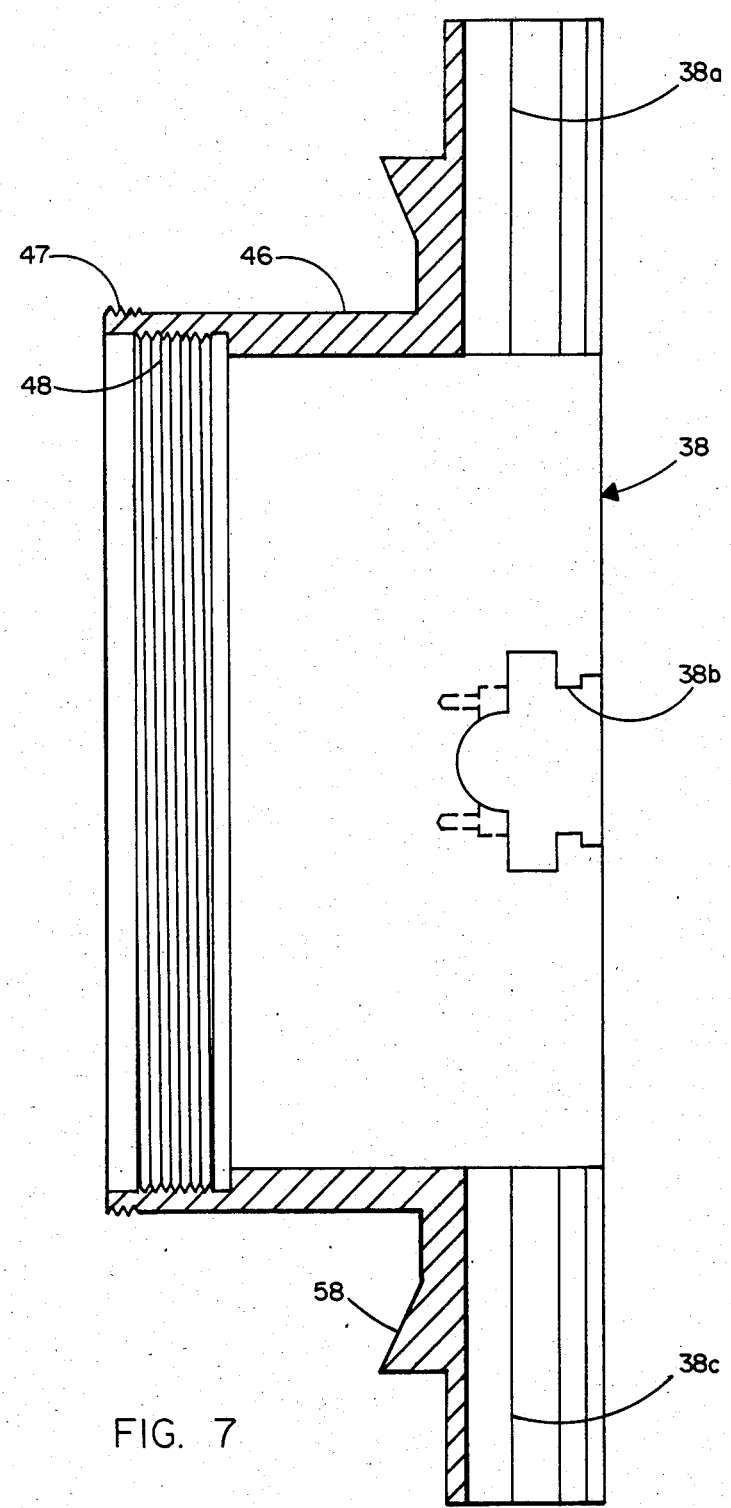
FIG. 7 is a cross-sectional view of the front plate member used in the apparatus of FIG. 3 as viewed generally along the centerline thereof.

As depicted in FIGS. 4 and 7, the front plate member 38 is configured with a central axially extending hub portion 46 which is lapped and internally threaded at 48 to coact with and receive a smaller threaded hub portion 50 of the rear plate member 39, the two parts thus being joined to form a rotatable hub with a central opening 44 with large diameter flanges of approximately the same diameter as the outer diameter of the housing yoke 35. The flange portions of the front and rear plate members 38 and 39, as assembled have the inner surfaces thereof in proximate relation to the axially outer front and rear edges of the housing yoke 35.

As shown in FIG. 4, the hub 46 of front plate 38 is configured for receiving thereon first and second enlarged diameter Timken bearings 52 and 53. The outer circumference of the bearings 52 and 53 are held in spaced relation on the shoulders 54 of the yoke 35 due to the intervening web portion 55 (See also FIGS. 5 and 6), while the inner circumference of the bearings 52 and 53 abut against the hub 46 of the front plate member 38 of the rotating jaw assembly 36.

A generally annular washer-shaped tension plate 57 is threadably secured to the outer end of the hub portion 46 of the front plate member 38 for maintaining and pre-loading the bearings 52 and 53 in position relative to the hub portion 46. For securing the tension plate 57, the inner circumference is suitably threaded for matingly engaging like threads formed on the outer surface of the outer edge 47 of the hub portion 46 of the front plate member 38. A set screw (not shown) is passed through a threaded aperture in the tension plate 57 for abutting against the side surface of the adjacent bearing 54.

As depicted in FIGS. 4 through 6, the inner opposite surfaces of the yoke 35 are machined radially outwardly of the bearings 52 and 53 to provide first and second annular shoulders 35a and 35b, with the adjacent surfaces of the plate members 38 and 39 being spaced therefrom and provided with inwardly extending axially opposed tapered annular flanges 58 and 59, respectively. These flanges 58 and 59 along with adjacent surfaces of the shoulders 35a and 35b form annular grooves configured for receiving therein annular oil seals 60 and 61, respectively, these seals having a generally L-shaped cross-section with a neoprene or rubber like portion for abutting with the adjacent surface of the flanges 58 and 59 to provide a sealed inner lubrication material containing compartment 35c within the interior of the portion of the apparatus between the yoke 35 and the hub 46 of the rotating jaw assembly 36.

To facilitate and cooling of the apparatus 30 during use thereof, as shown in FIG. 3, a generally peripheral separate cooling channel 62 is formed in the outer surface of the yoke 35 such as by machining, the length of the channel 62 traversing approximately 240 degrees of the periphery of the yoke 35. After machining, the channel 62 is sealed by a metal band 63 positioned on shoulders 63a formed on opposite sides of the channel 62. The metal band 63 may be welded or affixed by any conventional method to provide a fluid tight channel 62. At opposite ends of the channel 62, hose fittings 45a are threadably attached to openings which communicate with the channel 62 with the fittings 45a being attached to suitable hoses 45 for conducting cooling fluid through the channel 62 for cooling of the apparatus during rotation.

For purposes of lubrication of the bearings 52 and 53, a fitting 56 is provided in the upper central portion of yoke 35 for enabling the insertion of a suitable lubricant, such as oil, into the interior annular lubricating compartment 35c which generally houses the bearings 52 and 53, with the lubricant being contained therein by seals 60 and 61. After insertion of the lubricant, the fitting 56 is suitably capped with a screw member 56a. This lubrication compartment 35c is physically separate from the cooling channel 62, but excellent heat transfer is obtained due to the construction of the parts from thermally conductive material, such as suitable steel or aluminum alloys.

By reference to FIG. 4, the channel 62 and the flanges 58 and 59, as well as the interior surfaces of the assembled parts are constructed in such a way that the lubricant is wholly contained within compartment 35c, which wholly contains the bearings 52 and 53, with the flanges 58 and 59 being constructed so that the edges thereof are in close proximate relation to adjacent edges of the housing 35 of the annular channels supporting the seals 60 and 61 to provide minimal openings into these annular channels and thus minimize the force exerted on the seals 60 and 61 while maximizing the sealing of the rotating jaw assembly 36.

As shown in FIG. 8, for enabling minute adjustments of the yoke 35 relative to the bed of a lathe 16, the lower base member 34 is secured to the bed. The upper surface of the lower base member 32 is provided with first and second longitudinally aligned recesses 64 and 65 into which extend depending lugs 66 and 67, respectively, of the upper base member 34. Longitudinally extending apertures 68 and 69 in the lower base member 32 align with threaded apertures 70 and 71, respectively, in the depending lugs 66 and 67 of the upper base member 32 for engagement with screw members 72 (only one of which is shown). The recesses 64 and 65 have a length greater than the corresponding dimension of the lugs 66 and 67 for enabling adjustment of the upper base member 34 relative to the lower base member 32 by adjustment of the screws 72.

Similarly, adjustment in an orthogonal direction is accomplished by dovetail members 74 and 76 formed in the upper surface of upper base member 34 slidably coacting with matingly formed slots 78 and 80 formed in the lower edge of yoke 35 (See FIG. 3). As shown in FIG. 3, the slots 78 and 80 are slightly oversized in the transverse direction and are fitted with gib plates 79 and 81, respectively, with screw members 82 and 84 threadably fitted between the gib plates 79 and 81 and the adjacent portion of the yoke 35.

For securing the base assembly of FIG. 8 to the lathe, the lower base member 32 is provided with a centrally positioned threaded aperture 90 for receiving a screw member 92 which is passed through a clamp block 94 beneath the rails of the lathe bed. Tightening the screw 92 of the clamp block 94 attached to the base assembly secures the tooling apparatus 30 on the lathe 1 as depicted in FIG. 2.

In operation of the tooling apparatus 30, as shown in FIG. 2, the work piece 28 is secured within the chuck 29, with the work piece 28 extending through the enlarged opening 44 of the apparatus 30. The jaws 40-43 are adjusted into clamping engagement with the outer surface of the work piece 28. An eccentricity dial gauge (not shown) may then be secured relative to the lathe 16 with the arm thereof in contact with the surface of the work piece 28, and the work piece 28 then slowly rotated, with micrometer adjustments of the jaws 40-43 being effected to position the work piece at the true center of rotation of the rotating assembly 36 with the accuracy normal to such gauges, that is, within one half of a thousandths of an inch or better. This type of accuracy is not obtainable with the prior art steady rest since the tolerances of the small diameter bearings 22 at the ends of the arms 21 thereof, initially have looser tolerances, and with age the tolerance slackens substantially.

With the tooling apparatus 30 according to the invention, a tailstock is not needed, and the cutting can be accomplished at an overhanging end of the work piece 28, as depicted in FIG. 2, with the same degree of precision as cutting at a more central location with the work piece supported by a tailstock.

With the bearings 52 and 53 contained within the sealed lubrication compartment 35c, and with a separate cooling channel 62, higher speeds of rotation of the work piece 28 may be utilized for precision maching and cutting, thus significantly reducing the time required for such operations. Although four jaw members 40-43 have been depicted for enabling off-center positioning and rotation of the work piece 28, it is to be understood that the tooling apparatus 30 may be provided with three such jaw members if it is to be used solely with work pieces having the axis of rotation thereof on the axis of rotation of the lathe.

While there has been shown and described a preferred embodiment, it is to be understood that various other adaptations and modifications may be made within the spirit and scope of the invention.

I claim:

1. In a tooling apparatus for use with a machining lathe to support a work piece at a position displaced from the driven lathe chuck, the combination comprising:

base means for attachment to the lathe;

a yoke means adjustably secured to said base means, said yoke means having an enlarged diameter opening with bearing receiving surfaces formed therein and passage means in thermally conductive relation therewith;

an assembly rotatably mounted on said yoke means, said assembly having first and second plate members having interconnected hub portions within the enlarged opening of said yoke means to define, in conjunction with said yoke means, an annular compartment, said assembly having an enlarged diameter opening in the interconnected hub portions for passage therethrough of a work piece;

radially adjustable jaw means received within slot means in the surface of one of said first and second plate members for clamping engagement with the surface of the work piece;

bearing means received within said annular compartment and intercoupling said yoke means and said assembly;

means for sealing said annular compartment for enabling the providing of lubrication fluid to said bearing means;

means for pre-loading said bearing means; and means for providing cooling fluid to said passage means within said yoke means for enabling flow of cooling fluid therethrough to cool the parts during rotation of said assembly, said assembly being driven by said work piece as said driven chuck is rotated.

2. The combination according to claim 1 wherein said bearing means are roller type bearings.

3. In a tooling apparatus for use with a machining lathe to support a work piece at a position displaced from the driven lathe chuck, the combination comprising:

a housing yoke member having an enlarged opening and means for attachment to the lathe;

an assembly rotatably mounted on said yoke means, said assembly having an enlarged diameter opening for passage therethrough of a work piece, said rotatable assembly being in the form of a hub having a hub portion extendng through said yoke member opening with opposing flange portions in proximate relation to the opposing sides of said yoke member;

a plurality of radially adjustable jaw means on one of said flange portions of said assembly for clamping engagement with the surface of the work piece;

annular bearing means intercoupling said yoke means and said assembly;

means for pre-loading said bearing means;

an annular compartment formed within said apparatus about said bearing means for providing lubrication fluid to said bearing means; and cooling fluid passage means within said yoke means in thermally conductive relation to said annular compartment for enabling flow of cooling fluid therethrough to cool the parts during rotation of said assembly, said assembly being driven by said work piece as said driven chuck is rotated. said asssembly;

4. The combination according to claim 3 wherein said yoke means include a housing yoke member having an enlarged opening and said rotatable assemby is in the form of a hub having a hub portion extending through said yoke member opening with opposing flange portions in proximate relation to the opposing sides of said yoke member.

5. The combination according to claim 3 wherein said hub portion and said yoke member are configured for receiving said annular bearing means within said annular compartment.

6. The combination according to claim 5 wherein said annular compartment is a sealed lubrication compartment.

7. The combination according to claim 6 wherein said jaw means are four mutually perpendicularly positioned radially adjustable jaw members.

8. The combination according to claim 7 wherein said jaw members are coupled to radially extending slot means formed in one of said opposing flanges.

9. The combination according to claim 8 wherein said yoke member has an outer peripheral surface, and said cooling fluid passage means is formed in said peripheral surface over a significant portion thereof.

10. The combination according to claim 9 further including means in fluid relation with said cooling fluid passage means for circulating cooling fluid therethrough.

11. The combination according to claim 5 wherein said annular compartment includes first and second annular seal members for sealing said compartment.

12. In a tooling apparatus for use with a machining lathe to support a work piece at position displaced from the driven lathe chuck, the combination comprising:

a base assembly for attaching to the lathe;

a yoke member having a portion thereof adjustably received on said base assembly, said yoke member having an enlarged diameter opening with generally parallel opposing edges, the peripheral surface of the yoke member defining said opening having first and second annular shoulder means formed thereon, an assembly having first and second members with generally identically configured washer-shaped flange portions and integrally formed interconnecting hub portions, the inner surfaces of said flange portions engaging said opposing edges of said yoke member with said interconnecting hub portions passing through said opening for rotatably mounting on said yoke means, said flange portions having an enlarged diameter opening for passage therethrough of a work piece, the interior surfaces of said first and second members and said annular shoulder means defining an annular compartment;

annular bearing means received on said annular shoulder means within said annular compartment and operatively engaging the interior surface of said interconnecting hub portions for enabling rotation of said assembly relative to said yoke member;

means interengaging said hub portions and said bearing means for pre-loading said bearing means;

a plurality of radially adjustable jaw means on one of said flange portions of said assembly for clamping engagement with the surface of the work piece;

means for sealing said annular compartment for enabling the providing of lubrication fluid to said bearing means; and cooling fluid passage means within said yoke means for enabling flow of cooling fluid therethrough to cool the parts during rotation of said assembly, said assembly being driven by said work piece as said driven chuck is rotated.

13. The combination according to claim 12 wherein said jaw means are four mutually perpendicularly positioned radially adjustable jaw members received within slots formed in said one of said flange portions.

14. The combination according to claim 12 wherein said yoke member has an outer peripheral surface, and said cooling fluid passage means is formed in said peripheral surface over a significant portion thereof.

15. The combination according to claim 12 wherein said base assembly includes a first base member attachable to the lathe, and a second base member received on said first base member and adjustable relative thereto in a first direction, and wherein said yoke member is received on said second base member and is adjustable relative thereto in a second direction generally perpendicular to said first direction.

* * * * *